Feb. 18, 1969   A. H. TH. J. SLIEPENBEEK   3,428,931
LAMINATED MAGNETIC CORE STRUCTURES FOR TRANSFORMERS OR
CHOKE COILS OF GREAT POWER
Filed Jan. 18, 1968
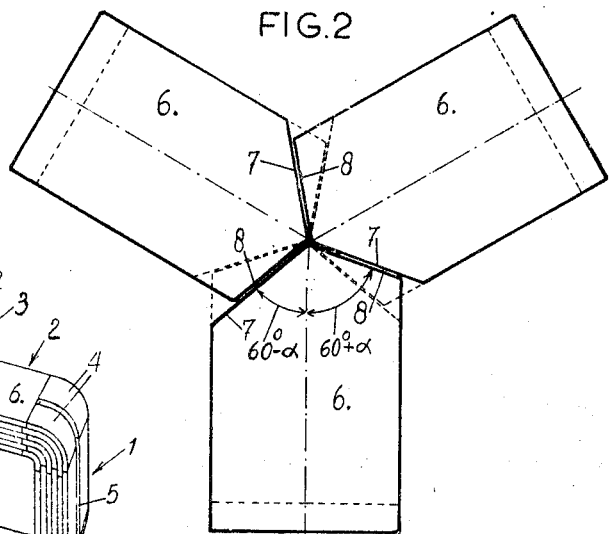
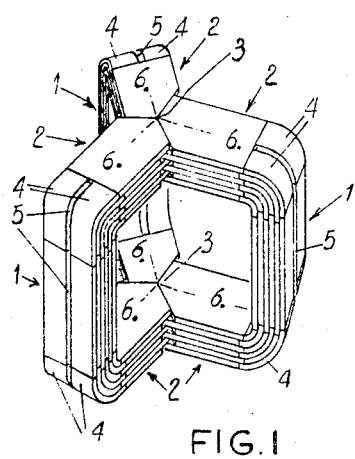
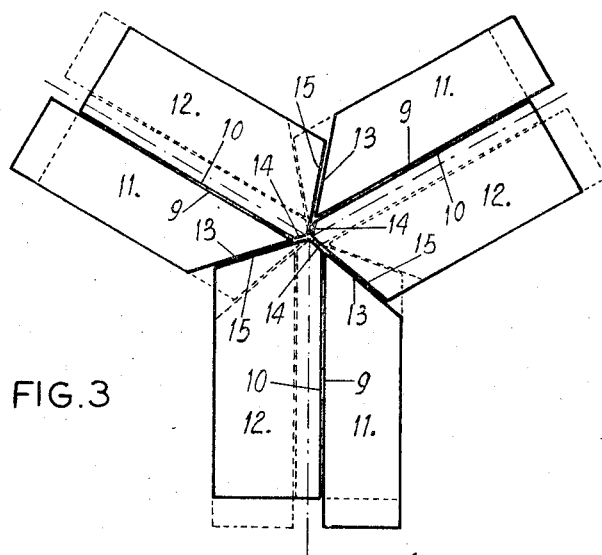
INVENTOR
ANTONIUS H. TH. J. SLIEPENBEEK
BY
ATTORNEY United States Patent Office 3,428,931
Patented Feb. 18, 1969

3,428,931
LAMINATED MAGNETIC CORE STRUCTURES FOR TRANSFORMERS OR CHOKE COILS OF GREAT POWER
Antonius H. Th. J. Sliepenbeek, Nijmegen, Netherlands, assignor to Smit Nijmegen Electrotechnische Fabrieken N.V., Nijmegen, Netherlands, a company of the Netherlands
Filed Jan. 18, 1968, Ser. No. 698,819
Claims priority, application Netherlands, Jan. 26, 1967, 6701227
U.S. Cl. 336—212
Int. Cl. H01f 27/24
1 Claim

ABSTRACT OF THE DISCLOSURE

A laminated magnetic core structure has three leg members extending with their central longitudinal axes in the longitudinal edges of an equilateral prism, two star-shaped yoke members, each of which has three abutting yoke arms enclosing engles of 120°, and coupling members, each of which connects an end of a leg member with the free end of a yoke arm. Each yoke arm has a central longitudinal axis which intersects, at a common point, the longitudinal axes of the remaining two yoke arms of a yoke member. In at least a part of the total number of layers of laminations of the yoke members, each yoke arm abuts the two other yoke arms with two straight end edges defining an angular point of 120° which coincides with said common point of intersection. In the said layers, one end edge of each yoke arm encloses an angle of $60°+\alpha$ and the other end edge thereof encloses an angle of $60°-\alpha$ with the central longitudinal axis of the relevant yoke arm.

---

The invention relates to a laminated magnetic core structure for a transformer or a choke coil of great power, comprising three leg members extending with their central longitudinal axes in the longitudinal edges of an equilateral prism, two star-shaped yoke members, each of which consists of three abuting yoke arms enclosing angles of 120° and having central longitudinal axes, which intersect in a common point, and coupling members, each of which connects an end of a leg member with the free end of a yoke arm, and in which core structure in at least a part of the total number of layers of laminations of the yoke members each yoke arm abuts the two other yoke arms with two straight end edges defining an angular point of 120° which coincides with said common point of intersection.

Magnetic core structures of this kind are disclosed in the United States patent specifications 2,634,321 (FIGS. 4, 5, 6) and 3,195,090 (FIGS. 5a, b, c). In the core structure disclosed in the first mentioned specification the two mentioned end edges of all laminations of each yoke arm enclose an angle of 60° with the central longitudinal axis of the relevant yoke arm and all angular points bounded by said end edges lie in the common point of intersection, so that the butt-joints between the laminations of the yoke arms are not overlapped and the mechanical connection between the yoke arms depends only on the friction between the yoke arms and external clamping plates. On the other hand, in the core structure disclosed in the United States specification 3,195,090 the yoke members comprise layers, in which the symmetrically directed angular points of the laminations of the yoke arms coincide with the common point of intersection of the central longitudinal axes of the yoke arms, said layers alternating with layers, in which said angular points lie beside said central longitudinal axes, which results in that the butt-joints between the laminations of different yoke arms lie in offset relation and the yoke arms intermesh with overlapping marginal regions, which is to the benefit of the mechanical connection of the yoke arms. A disadvantage of this known core structure is, that at least four different yoke laminations are required and that the yoke laminations having asymmetrical end edges abut each other with relatively short butt-joints.

The invention has the object to avoid the disadvantages of the known magnetic core structures in a simple manner. It consists in that in the said layers one end edge of each yoke arm encloses an angle of $60°+\alpha$ and the other end edge thereof encloses an angle of $60°-\alpha$ with the central longitudinal axis of the relevant yoke arm. Consequently, the joints between the yoke arms, which abut each other at angles of 120°, have been rotated through an angle of $\alpha$ in respect of the symmetrical construction. It will be clear that layers, in which said joints have been rotated to the left, alternate one by one or in groups with layers, in which said joints have been rotated to the right, so that the joints of consecutive layers or groups of layers lie in offset relation and overlapping areas having the shape of triangles, of which the base points outwards, are obtained. These overlapping areas have the advantage that they are broadest at the outer edges of the yoke members, so that a strong mechanical connection between the yoke arms is obtained. In this case the number of different yoke laminations may be reduced to two only.

The invention will be further elucidated with the aid of the drawing. Therein is:

FIG. 1 a view in perspective of a laminated magnetic core structure according to the inventiton, FIG. 2 on a larger scale a plan view of a layer of laminations of a yoke member for a magnetic core structure shown in FIG. 1, and FIG. 3 on a larger scale a plan view of a layer of laminations for a variant of the yoke member shown in FIG. 2.

In FIG. 1 of the drawing 1 are three vertical leg members extending with their central longitudinal axes in the longitudinal edges of an equilateral prism 2 are three horizontal yoke arms meeting with their central longitudinal axes in a common point of intersection 3 and enclosing angles of 120° and 4 are circle-cylindrically curved coupling members extending between said leg members and said yoke arms of the magnetic core structure of a transformer or a choke coil of large power.

In the embodiment the leg members and the coupling members consist in each layer of two laminations of equal widths separated from one another by a cooling gap 5. However, the leg members and the coupling members may also consist in each one of the said layers of one single broad lamination.

In the embodiment shown in FIGS. 1 and 2 each yoke arm consists in the layers in question of one single broad lamination 6, which enclose with their end edges 7, 8 an angular point of 120° lying in the point of intersection 3 and abut with said end edges the laminations of the other yoke arms. The laminations of a preceding layer are indicated by dotted lines. The laminations of said layer are a little bit shorter than the laminations 6, so that the joints between the yoke arms and the coupling members come to lie in offset relation in order to get a strong mechanical connection between the yoke arms and the coupling members.

In accordance with the invention in each lamination the angle between the end edge 7 and the central longitudinal axis is equal to $60°-\alpha$ and the angle between the end edge 8 and the central longitudinal axis is equal to $60°+\alpha$. The end edges 7 and 8 of the laminations of different layers are rotated either to the left or to the right in respect of the known symmetrical construction. That is why the laminations of consecutive layers or consecutive groups of layers overlap each other with substantially triangular areas, of which the greatest widths are located near the outer edges of the yoke members, so that a strong mechanical connection is obtained between the yoke arms.

It will be apparent that to form the yoke members shown in FIG. 2 only two different laminations are required. These laminations have the same two end edges and equal angular points but the lengths of the two end edges of each lamination differ.

In FIG. 3 it is shown that in the relevant layers of the yoke member each yoke arm may also consist of two abutting laminations 11, 12 extending side by side with their longitudinal edges 9, 10 parallel to the central longitudinal axis. Therein the lamination 11 abuts with a straight end edge 13 the lamination 12 of another yoke arm and the lamination 12 abuts with straight end edges 14 and 15 enclosing an angle of 120° the laminations 12 of the two other yoke arms as well as the lamination 11 of one of the said two other yoke arms. The division of the laminations of the yoke arms has the advantage, that the yoke arms can be made broader than the broadest available lamination. Moreover, said laminations can be cut without any substantial loss from strips of unlimited length, since the laminations 11 can abut one another with their end edges 13 in an uninterrupted way and the laminations 12 can abut each other with their end edges 15 in an almost uninterrupted manner. A yoke member of this construction can also be composed of two different laminations.

What I claim is:

1. A laminated magnetic core structure for a transformer or a choke coil of great power, comprising three leg members extending with their central longitudinal axes in the longitudinal edges of an equilateral prism, two star-shaped yoke members, each of which consists of three abutting yoke arms enclosing angles of 120° and having central longitudinal axes, which intersect in a common point, and coupling members, each of which connects an end of a leg member with the free end of a yoke arm, and in which core structure in at least a part of the total number of layers of laminations of the yoke members each yoke arm abuts the two other yoke arms with two straight end edges defining an angular point of 120° which coincides with said common point of intersection, characterized in that in the said layers one end edge of each yoke arm encloses an angle of 60°+α and the other end edge thereof encloses an angle of 60°−α with the central longitudinal axis of the relevant yoke arm.

References Cited

UNITED STATES PATENTS

| | | | |
|---|---|---|---|
| 2,594,001 | 4/1952 | Ellis et al. | 336—210 XR |
| 2,456,459 | 12/1948 | Somerville | 336—217 XR |
| 2,634,321 | 3/1953 | Larkin | 336—215 |
| 3,195,090 | 7/1965 | Burkhardt et al. | 336—217 XR |

LEWIS H. MYERS, *Primary Examiner.*

T. J. KOZMAN, *Assistant Examiner.*

U.S. Cl. X.R.

336—217